(No Model.)
L. A. MANCINI.
HARNESS SADDLE.
No. 474,752. Patented May 10, 1892.
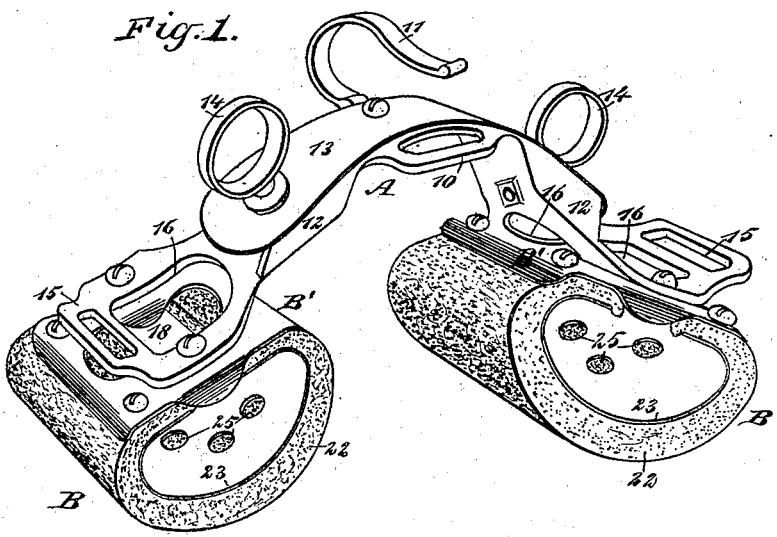
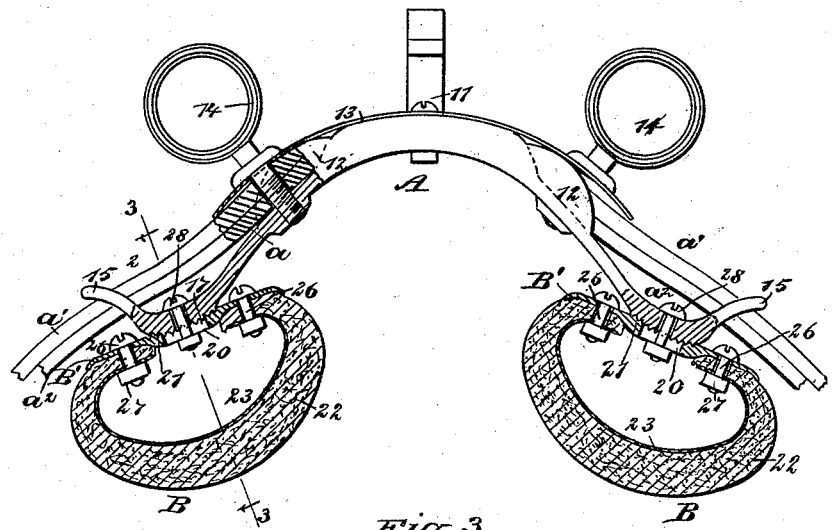
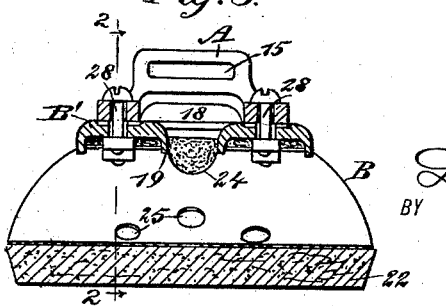
WITNESSES:
C. Sedgwick
E. M. Clark
INVENTOR
L. A. Mancini
BY
Munn & Co.
ATTORNEYS.
THE NORRIS PETERS CO., PHOTO-LITHO., WASHINGTON, D. C.

UNITED STATES PATENT OFFICE.

LOUIS A. MANCINI, OF MONTCLAIR, NEW JERSEY.

HARNESS-SADDLE.

SPECIFICATION forming part of Letters Patent No. 474,752, dated May 10, 1892.

Application filed July 23, 1891. Serial No. 400,475. (No model.)

*To all whom it may concern:*

Be it known that I, LOUIS A. MANCINI, of Montclair, in the county of Essex and State of New Jersey, have invented a new and Improved Single-Harness Saddle, of which the following is a full, clear, and exact description.

My invention relates to an improved saddle for single harness, and has for its object to provide a saddle capable of being expeditiously and conveniently fitted to the back of any horse, and a further object of the invention is to provide a saddle the tree of which will be at an elevation above the back of the animal to which the saddle is applied, and also to so construct the pads that they will not chafe or otherwise injure the skin of the animal, and to provide for an ample ventilation of the pads.

Another object of the invention is to construct a saddle which will be simple, durable, and economic.

The invention consists in the novel construction and combination of the several parts, as will be herinafter fully set forth, and pointed out in the claims.

Reference is to be had to the accompanying drawings, forming a part of this specification, in which similar figures and letters of reference indicate corresponding parts in all the views.

Figure 1 is a perspective view of the saddle. Fig. 2 is a side elevation thereof, the pads being in transverse section, the position of which section is indicated by the line 2 2 in Fig. 3; and Fig. 3 is a longitudinal section taken through one of the pads, the section being designated by the line 3 3 in Fig. 2.

The tree A of the saddle is preferably made of metal and is more or less arch shape longitudinally, and the ends of the tree are upturned, as is best shown in Fig. 2. Upon the body portion of the tree, at the top, a loop 10 is constructed at one side, and the hook 11 for the checkrein is located at the opposite side. At each side of the central portion of the tree vertical flanges 12 are constructed, whereby channels $a$ are formed for the reception of the upper ends of straps $a'$ and $a^2$, one of said straps being adapted to lead to the girths and the other to the tug. The straps are held in position through the medium of a spring-plate 13, attached, preferably, to the central portion of the tree at its upper face, and the ends of the plate extend over the channels $a$ in the tree. The guide-rings 14 of the saddle, through which the lines pass, are screwed down through the plate 13 near its ends and through the base-walls of the channels $a$, which walls are provided with threaded apertures to receive the threaded shanks of the rings. The ring-shanks pass through the straps $a'$ and $a^2$ and serve to hold them in their proper position in the tree-channels $a$, and when the rings have been screwed fully down to place the spring-plate 13 will be made to bear upon the straps, as is illustrated in Fig. 2. The upturned ends of the tree are formed as loops 15, through which the straps $a'$ and $a^2$ pass. By this means the straps are prevented from having lateral movement, and in order to render the saddle as light as possible openings 16 are formed therein between their end loops and the channels $a$. That portion of the tree adjacent to the end loops 15 is semicircular upon its under face, and the semicircular portions are located at each side of the openings 16, and the said surfaces are provided with a series of teeth 17, preferably transversely located.

In connection with the tree two pads B are employed. These pads are of peculiar construction. A top plate B' is provided for each pad. The top plate is essentially rectangular in general contour, being provided with a central opening 18, the side walls of which at the center are curved downward, as illustrated at 19 in Fig. 3. At each side of the central opening 18 smaller elongated openings 20 are produced, the width of the openings being illustrated in Fig. 3 and their length in Fig. 2. The surface of the plate B' around these openings 20 is countersunk, so as to produce concaved recesses, and the base-walls of said recesses are provided with teeth 21, transversely arranged.

In connection with the plate B' of the pad a strip of a soft or yielding material 22—such as felt—is employed and a metal shaping-plate 23. The metal shaping-plate is cylindrical upon its under face and its ends are bent upward horizontally over the inner face of the lower portion of the plate, as shown in Fig. 1, and preferably the upper edges of the shaping-plate are provided with a recess 24 at their centers, as illustrated in Fig. 3. The ends of the shaping-plate are ordinarily made convexed, and the central portion of the shaping-plate is longer than the back plate B' of the pad. By this means the shaping-plate will extend beyond the ends of the back plate. The shaping-plate at its bottom portion has a series of apertures 25 produced therein, and the felt strip 22 is made to cover the under face of the shaping-plate, clinging closely thereto, and the side edges of the strip are carried upward over and beyond the upper side edges of the plate, as is illustrated in Figs. 2 and 3. The shaping-plate and its covering of felt are secured to the back plate through the medium of bolts 26, provided with suitable nuts 27. The bolts are passed downward through the back plate near the corners thereof, through the felt and the upper edges of the shaping-plate, the nuts being screwed upon the lower projecting ends of the bolts.

The pad thus formed is attached to the tree in the following manner: The toothed surfaces of the tree are made to engage with the toothed surfaces of the recesses formed around the openings 20 in the back plate of the pad. A bolt 28, provided with a suitable nut, is then passed down through the toothed surfaces of the tree and through the openings 20 in the back plate of the pad, the lower ends of the bolts being provided with suitable nuts. By this means the pads are rendered adjustable upon the tree, and may be carried vertically inward to fit snugly to the backs of lean horses or outward to accommodate themselves to the backs of horses in better condition.

It will be observed that a saddle so constructed is exceedingly durable and that the tree is at no time brought in engagement with the back of the animal to which the saddle is applied. It will be further observed that the outer surfaces of the pads are cylindrical and soft, and as they can be accommodated to the shape of the back will not chafe the skin; and a very important advantage is obtained by the construction of the pads, which consists in the ends of the pads being open, so that currents of air may pass through the pads between the shaping-plates and the back plates unobstructed, thus cooling the plate and the felt beneath it, the operation of cooling being augmented by the apertures 25 in the shaping-plate, which expose the surfaces of the felt.

Having thus described my invention, I claim as new and desire to secure by Letters Patent—

1. In a harness-saddle, a harness-saddle tree A, having its ends upturned and transversely slotted, as shown at 15 15, bolt-apertures through the curved end portions, side flanges 12 at its arched portion, terret-apertures between each pair of flanges, the cover-plate 13, and the terrets having screws extending through plate 13, substantially as set forth.

2. The combination, with the saddle-tree having the lower faces of its ends toothed or serrated and apertured, of the pads having slotted plates provided with toothed upper surfaces engaging those of the tree, and the securing-bolts passed through said apertures and slots, substantially as set forth.

3. In a harness saddle, the combination, with the tree thereof arched at its central portion and provided with toothed surfaces on its under side near its ends, of pads, each consisting of a back plate having elongated slots therein surrounded by recesses, the base-walls of which are toothed, and said recesses being adapted to receive the toothed surfaces of the tree, a bowed shaping-plate, a soft strip, as of felt, covering the outer portion of the shaping-plate, the said shaping-plate and strip being rigidly attached to the back plate, and bolts passed through the tree and the openings in the back plates of the pads, substantially as shown and described, whereby the tree is not brought in engagement with the animal's back and the pads are adjustable upon the tree and open from end to end, as specified.

4. In a harness-saddle, a harness-pad plate B', having a central opening 18, slots 20 at opposite sides of the opening, and depending flanges 19, the upper surface of the plate being toothed at opposite sides of the slots, substantially as set forth.

5. In a harness-saddle, a harness-pad comprising an attaching-plate B', the shaping-plate 23 bowed, as shown, with its opposite ends brought toward each other beneath the ends of the plate B', the covering 22 on the outer face of the shaping-plate, and the bolts 26, extending through the ends of plates B 23 and the covering, substantially as set forth.

LOUIS A. MANCINI.

Witnesses:
J. FRED. ACKER,
C. SEDGWICK.